United States Patent [19]

Howell

[11] Patent Number: 4,647,699
[45] Date of Patent: Mar. 3, 1987

[54] NEW DIAMINES AND A PROCESS FOR THEIR PRODUCTION

[75] Inventor: Frederick H. Howell, Lancashire, England

[73] Assignee: Ciba-Geigy Corporation, Ardsley, N.Y.

[21] Appl. No.: 719,197

[22] Filed: Apr. 3, 1985

Related U.S. Application Data

[63] Continuation of Ser. No. 388,361, Jun. 4, 1982, abandoned.

[30] Foreign Application Priority Data

Jun. 19, 1981 [GB] United Kingdom ............... 8119007

[51] Int. Cl.$^4$ ............................................. C07C 91/16
[52] U.S. Cl. .................. 564/374; 260/501.1; 556/81; 556/118; 564/338; 564/381; 564/384
[58] Field of Search ............... 564/374, 384, 381, 338

[56] References Cited

U.S. PATENT DOCUMENTS

| | | | |
|---|---|---|---|
| 2,891,088 | 6/1959 | Condo et al. | 564/374 X |
| 3,388,103 | 6/1968 | Imohl et al. | 564/374 X |
| 3,729,475 | 4/1973 | Williamson et al. | 564/374 X |
| 3,776,890 | 12/1973 | Lee | 564/381 X |
| 4,554,379 | 11/1985 | Howell | 564/374 |

Primary Examiner—Robert V. Hines
Attorney, Agent, or Firm—Luther A. R. Hall

[57] ABSTRACT

New aminoalkyl anilines having the formula:

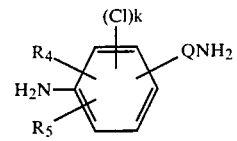

wherein k is 0 or 1; $QNH_2$ is a residue of formula

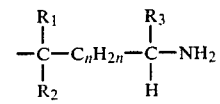

which is situated in one of the positions of the benzene ring ortho or para to the amino group and wherein n is an integer from 1 to 15, $R_1$ is $C_1$-$C_8$ alkyl, $R_2$ is $C_1$-$C_4$ alkyl or $R_1$ and $R_2$, together with the carbon atom to which they are attached, form a $C_5$-$C_8$ cycloalkylene residue, $R_3$ is H or $C_1$-$C_6$ alkyl, $C_3$-$C_8$ cycloalkyl, or $C_6$-$C_{10}$ aryl; and $R_4$ and $R_5$ are H or $C_1$-$C_4$ alkyl; as well as the corresponding salts of compounds of formula I with organic or inorganic acids and metal salt complexes; process for their production; and their use as intermediates for polyamides.

8 Claims, No Drawings

NEW DIAMINES AND A PROCESS FOR THEIR PRODUCTION

This is a continuation of application Ser. No. 388,361, filed June 4, 1982, now abandoned.

The present invention relates to new diamines and to a process for their production.

The present invention provides new aminoalkyl aromatic amines of formula:

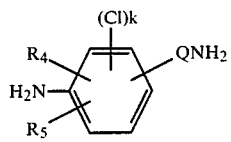

I wherein k is 0 or 1; $QNH_2$ is a residue of formula

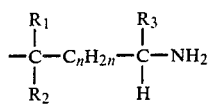

II which is situated in one of the positions of the benzene ring ortho or para to the amino group and wherein n is an integer from 1 to 15, $R_1$ is $C_1$–$C_8$ alkyl, $R_2$ is $C_1$–$C_4$ alkyl or $R_1$ and $R_2$, together with the carbon atom to which they are attached, form a $C_5$–$C_8$ cycloalkylene residue, $R_3$ is H or $C_1$–$C_6$ alkyl, $C_3$–$C_8$ cycloalkyl, or $C_6$–$C_{10}$ aryl; and $R_4$ and $R_5$ are H or $C_1$–$C_4$ alkyl; as well as the corresponding salts of compounds of formula I with organic or inorganic acids and metal salt complexes.

When $R_1$ is an alkyl group, it may be straight or branch chain and may be e.g. a methyl, ethyl, n-propyl, isopropyl, n-butyl, isobutyl, sec-butyl, n-amyl, n-hexyl, hept-3-yl, or n-octyl group.

When $R_2$, $R_4$ and/or $R_5$ is an alkyl group it may be straight or branch chain and it may be e.g. methyl, ethyl, n-propyl, isopropyl, n-butyl, isobutyl, or sec-butyl.

When $R_1$ and $R_2$, together with the carbon atom to which they are attached, form a cycloalkylene chain, this may be a cyclopentylene, cyclohexylene, cycloheptylene or cyclooctylene residue. When $R_3$ is an alkyl group it may be straight or branch chain and may be e.g. a methyl, ethyl, n-propyl, iso-propyl, n-butyl, sec-butyl, amyl or hexyl group. Cycloalkyl groups $R_3$ may be e.g. cyclopropyl, cyclobutyl, cyclopentyl, cyclohexyl, cycloheptyl or cyclooctyl groups. When $R_3$ is an aryl group it may be a phenyl or naphthyl group.

Examples of salts of the compounds of formula I are the hydrochloride, sulphate, nitrate, phosphate, methane sulphonate, methane phosphonate, p-toluene sulphonate, acetate, benzoate, oxalate, succinate, maleate, adipate and isophthalate salts.

Examples of metal salt complexes are the zinc chloride and stannous chloride complexes.

Preferred compounds of formula I are those wherein k is 0, and $R_4$, $R_5$ and $QNH_2$ have their previous significance. Especially preferred compounds of formula I are those wherein k is 0, $R_4$ and $R_5$ independently are H or $C_1$–$C_3$ alkyl, more particularly methyl and especially hydrogen, and $QNH_2$ has its previous significance wherein n is 1 to 15, more particularly 3, 8 or 9, $R_1$ is $C_1$–$C_6$ alkyl particularly $C_1$–$C_4$ alkyl, especially methyl or ethyl, $R_2$ is $C_1$–$C_3$ alkyl, particularly methyl or ethyl especially methyl and $R_3$ is $C_1$–$C_6$ alkyl, more particularly $C_1$–$C_4$ alkyl and especially methyl or isopropyl.

Examples of compounds of formula I are:
2-amino-6-(4-aminophenyl)-6-methyl-heptane
2-amino-6-(4-amino-3-methylphenyl)-6-methyl-heptane
2-amino-6-(2-amino-5-methylphenyl)-6-methyl-heptane
2-amino-6-(4-amino-3,5-dimethylphenyl)-6-methyl-heptane
2-amino-6-(4-amino-3-ethylphenyl)-6-methyl-heptane
2-amino-6-(4-amino-3,5-diethylphenyl)-6-methyl-heptane
2-amino-6-(4-amino-3-isopropylphenyl)-6-methyl-heptane
2-amino-6-(4-amino-3,5-diisopropylphenyl)-6-methyl-heptane
2-amino-6-(4-amino-3-methyl-5-isopropylphenyl)-6-methyl-heptane
2-amino-6-(4-amino-3-sec.butylphenyl)-6-methyl-heptane
2-amino-6-(4-amino-3-ethyl-5-sec.butylphenyl)-6-methyl-heptane
2-amino-6-(4-amino-3-chlorophenyl)-6-methyl-heptane
2-amino-6-(4-amino-3-chloro-5-methylphenyl)-6-methylheptane
2-amino-6-(4-amino-3,5-dichlorophenyl)-6-methyl-heptane
2-amino-6-(4-amino-3,5-di-sec.butylphenyl)-6-methyl-heptane
2-amino-6-(4-amino-3-methyl-5-ethylphenyl)-6-methyl-heptane
2-amino-6-(4-amino-3-methyl-5-sec.butylphenyl)-6-methylheptane
3-amino-12-(4-aminophenyl)-2,12-dimethyl-tetradecane
3-amino-12-(4-amino-3-methylphenyl)-2,12-dimethyl-tetradecane
3-amino-12-(2-amino-5-methylphenyl)-2,12-dimethyl-tetradecane
3-amino-12-(4-amino-3,5-dimethylphenyl)-2,12-dimethyl-tetradecane
3-amino-12-(4-amino-3-ethylphenyl)-2,12-dimethyl-tetradecane
3-amino-12-(4-amino-3-isopropylphenyl)-2,12-dimethyl-tetradecane
3-amino-12-(4-amino-3-methyl-5-isopropylphenyl)-2,12-dimethyl-tetradecane
3-amino-13-(4-aminophenyl)-2,13-dimethyl-tetradecane
3-amino-13-(4-amino-3-methylphenyl)-2,13-dimethyl-tetradecane
3-amino-13-(2-amino-5-methylphenyl)-2,13-dimethyl-tetradecane
3-amino-13-(4-amino-3,5-dimethylphenyl)-2,13-dimethyl-tetradecane
3-amino-13-(4-amino-3-ethylphenyl)-2,13-dimethyl-tetradecane
3-amino-13-(4-amino-3-isopropylphenyl)-2,13-dimethyl-tetradecane
3-amino-13-(4-amino-3-methyl-5-isopropylphenyl)-2,13-dimethyl-tetradecane
1-amino-11-(4-aminophenyl)-2,11-dimethyl-dodecane
1-(4-aminophenyl)-1-(9-amino-9-cyclohexyl-non-1-yl)-cyclohexane
1-amino-10-(4-aminophenyl)-10-methyl-1-phenyl-decane
3-amino-12-(4-aminophenyl)-12-methyl-tetradecane
3-amino-13-(4-aminophenyl)-13-methyl-tetradecane
1-(4-aminophenyl)-1-(3-amino-dodec-12-yl)-cyclohexane.

According to the present invention, there is also provided a process of producing compounds of formula I which comprises reacting an aromatic amine having the formula:

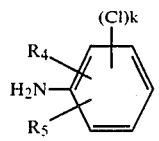

wherein k, $R_4$ and $R_5$ have their previous significance and wherein at least one ortho- or para-position of the benzene ring relative to the amino group is unsubstituted, with a compound IV which is an amino-alcohol, amino olefin or diamine, or salt thereof with an organic or inorganic acid, which compound IV is capable of introducing a group of formula

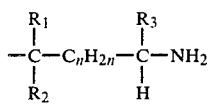

into the amine of formula III, the reaction being effected in the presence of an acid at an elevated temperature.

Preferably, the compound (IV) is an amino-alcohol, or salt thereof with an organic or inorganic acid and is capable of providing, or of being converted into a residue of formula II.

The molar proportions of amine III to alkylating agent IV may vary within the range of from 10:1 to 1:3 respectively. When an excess of amine III is used, this excess may be recovered, e.g. by distillation, and recycled.

The reaction between the aromatic amine of formula III and the alkylating agent IV is preferably effected in the presence of a metal salt, as co-catalyst, and optionally at superatmospheric pressure.

Alkylating agents IV which are reacted with amines III contain a reactive centre e.g. an olefinic, hydroxy or amino group which is eliminated, transformed or rearranged during the course of the alkylation reaction.

The reaction is effected at an elevated temperature e.g. a temperature in the range of from 100° to 250° C., more preferably in the range of from 170° to 190° C. Atmospheric or superatmospheric pressures may be employed. Superatmospheric pressures may be applied in a suitable pressure vessel e.g. a sealed glass reactor or an acid-resistant pressure vessel e.g. a tantalum lined reactor. Any superatmospheric pressure used is preferably below 100 atmospheres.

An essential feature of the process of the invention is the use of an acid as catalyst. The acid may be inorganic or organic or a partial salt thereof. Examples of such acids are hydrochloric, sulphuric and orthophosphoric acids; alkyl-, aryl- or alkaryl-substituted inorganic acids e.g. methane- or ethane-sulphonic acids, benzene sulphonic acid, p-toluene sulphonic acid and methane phosphonic acid; dichloro-acetic acid, trichloro-acetic acid or trifluoroacetic acid.

The proportion of acid catalyst present per mole of aromatic amine is preferably in the range 0.25 to 1.5 mole and especially 0.5 to 1.0 mole.

The preferred acid is hydrochloric acid.

The alkylation is preferably carried out in the presence of a co-catalyst which is a metal salt, oxide, hydroxide, or carbonate and where the metal belongs to Group II, III or VIII of the Periodic Table of Elements. Such metals are preferably Mg, Cd, Zn, Al, Fe, Co and Ni.

The metal salt is preferably that which shares the ion common to the acid used to catalyse the reaction and may be halide, sulphate or phosphate, for example.

If a metal carbonate, oxide or hydroxide is employed as co-catalyst, then sufficient of the acid over and above that required to catalyse the alkylation should be present so as to form the metal salt.

The metal salt may be present in a concentration of up to 1.0 mole, or more especially within the range 0.25 to 0.5 mole per mole of aromatic amine. The preferred metal halide for use as co-catalyst is $ZnCl_2$.

In one embodiment of the process of the invention, water is present in the reaction mixture. The amount of water present is at least 30% by weight based on the acid used. The presence of this substantial amount of water, relative to acid, is important in order to ensure that the reaction mixture forms a homogeneous solution. In preferred instances in which the acid used is hydrochloric acid, the amount of water which is preferably used is 64% by weight relative to HCl viz. the commercially available concentrated HCl (36% weight/weight). Clearly, relative to the total reaction mixture, large excesses of water are to be avoided in the interest of output efficiency from a given reactor volume.

If desired, a further solvent may be present provided that it remains inert during the reaction.

In a further embodiment of this invention, the reaction may be carried out at atmospheric pressure in the temperature range 100°–200° C. and most preferably in the range 170°–190° C. This temperature range is achieved when working at atmospheric pressure by the distillative removal of water. The presence of water arises from the use of reaction mixtures formulated with aqueous hydrochloric acid, and that generated from the use of hydroxyamino alkylating agents. To obtain the preferred working temperature of 170°–190° C. the water arising from these sources has to be removed in total.

After completion of the alkylation, the alkylated aromatic amine may be isolated as the salt or acid/metal salt complex, or may be freed from the acid or acid/metal salt complex by treatment with a base. Suitable bases for this purpose are alkali metal hydroxides, carbonates, bicarbonate, and ammonium hydroxide. The preferred bases are sodium and ammonium hydroxide. These bases are especially preferred in the instance where the co-catalyst is $ZnCl_2$ where the initially precipitated basic zinc salts are readily dissolved up again with the excess base and enable the alkylated aromatic amine to be readily isolated. Examples of amines of formula III are:
aniline
o, m and p-toluidine
o-ethylaniline
o-isopropylaniline
o-sec-butylaniline
o-chloroaniline
2,6-dimethylaniline
2,6-diethylaniline
2,6-diisopropylaniline
2-methyl-6-ethylaniline
2-methyl-6-isopropylaniline 2-methyl-6-sec-butylaniline
2-ethyl-6-sec-butylaniline
2-chloro-5-methylaniline
2-chloro-6-methylaniline
5-chloro-2-methylaniline The alkylating agent IV used in the process of the present invention may be an olefin, alcohol or alkylamine which is capable of introducing a group of formula II into the benzene nucleus of the aromatic amine of formula III. The reactive centre contained in the alkylating agent IV may be OH, an olefinic bond, or an $NH_2$ group on a tertiary carbon atom.

Compounds IV capable of introducing a group of formula II into the molecule of the aromatic system of formula III, include those having the formula:

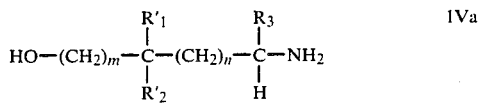

wherein $R_3$ has its previous significance and, when m is 0, n is 1 to 15, $R_1'$ is $C_1-C_8$ alkyl, $R_2'$ is $C_1-C_4$ alkyl, or $R_1'$ and $R_2'$, together with the carbon atom to which they are attached, form a $C_5-C_8$ cycloalkylene residue and, when m is 1, n is 1 to 14, $R_1'$ is $C_1-C_7$ alkyl, $R_2'$ is H or $C_1-C_3$ alkyl or $R_1'$ and $R_2'$, together with the carbon atom to which they are attached, form a $C_5-C_7$ cycloalkylene residue.

When m is 1 in the compounds of formula IVa, the methylene group $(CH_2)_m$ is caused to insert into one of the groups $R_1'$, $R_2'$ or $-C_nH_{2n}-$ thereby increasing by one the carbon number of that group.

Examples of compounds of formula IVa include those wherein m=0, n=3, and $R_1'$, $R_2'$ and $R_3$ are each methyl; m=0, n=8, $R_1'$ and $R_2'$ are each methyl and $R_3$ is isopropyl; and m=1, n=8 and $R_1'$, $R_2'$ and $R_3$ are as follows:

| $R'_1$ | $R'_2$ | $R_3$ |
|---|---|---|
| $CH_3$ | $CH_3$ | $C_2H_5$; |
| $CH_3$ | $CH_3$ | $C_3H_7$ |
| $C_3H_7$ | $C_3H_7$ | $CH_3$ |
| $C_2H_5$ | $C_2H_5$ | $C_4H_9$ |
| $C_2H_5$<br>$\diagdown$<br>$\phantom{xx}$CH—<br>$\diagup$<br>$C_4H_9$ | $C_2H_5$ | $C_4H_9$ |
| $-\!\!(CH_2)_5\!\!-$ | | $\bigcirc$ |
| $C_2H_5$ | $C_2H_5$ | $(C_2H_5)_2CH-$ |
| $CH_3$ | H | $C_6H_5$ |

Suitable amino-alcohols for use as compound IV may be appropriate compounds selected from the 11-amino-undecanols having the formula:

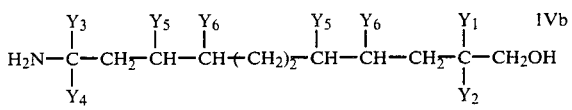

wherein $Y_1$ and $Y_3$, independently, are H or $C_1-C_8$ alkyl; $Y_2$ and $Y_4$, independently, are $C_1-C_8$ alkyl; or $Y_1$ and $Y_2$ and/or $Y_3$ and $Y_4$, together with the C atoms to which they are bonded, form $C_4-C_8$ cycloaliphatic ring; and $Y_5$ and $Y_6$, independently, are H or $C_1-C_4$ alkyl.

These 11-amino-undecanols are described in more detail, together with their method of manufacture in German Offenlegungsschrift No. 2831299.

Especially preferred are heptaminol(2-amino-6-hydroxy-6-methyl-heptane) and 11-amino-2,2,12-trimethyl-tridecan-1-ol.

Amino-olefins IV capable of introducing a group of formula II into the molecule of the aromatic system of formula III include 2-amino-6-methyl-hept-5-ene and 2-amino-6-m-thylhept-6-ene.

Diamines IV containing one amino group on a tertiary carbon atom which may be used to introduce a group of formula II into the molecule of the aromatic system of formula III include 1,11-diamino-2,11-dimethyl dodecane.

The compounds of formula I are useful as intermediates for other compounds e.g. in the production of new transparent polyamides, and which are distinguished by improved thermoplastic processing characteristics, are resistant to boiling water, and which further have a low water absorption, high stability to hydrolysis, good dimensional stability under the action of moisture, and correspondingly improved mechanical and electrical properties.

The novel polyamides have a reduced specific viscosity of at least 0.3 dl/g, preferably about 0.5 to about 2.0 dl/g, and particularly about 0.7 to about 1.8 dl/g, measured on a 0.5% solution in m-cresol at 25° C., and they consist of recurring structural elements of formula V

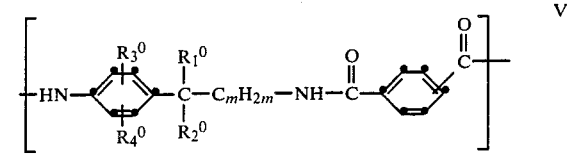

wherein
m is an integer of from 4 to 16,
$R_1^0$ is $C_{1-6}$ alkyl
$R_2^0$ is $C_{1-3}$ alkyl, and
$R_3^0$ and $R_4^0$ independently of each other are hydrogen or $C_{1-3}$ alkyl, and whereby the carbonyl groups in the structural elements of formula I are linked to the benzene ring in 1,3- and/or 1,4-position.

The following Examples further illustrate the present invention. Parts and percentages shown therein are by weight. Pressures shown therein are expressed in millibars, and temperatures are in degrees centigrade.

EXAMPLE 1

To a solution of 102 parts of anhydrous zinc chloride in 153 parts of 36% w/w aqueous hydrochloric acid and 200 parts of water were added 140 parts of aniline and 136 parts of 6-hydroxy-6-methyl-2-heptylamine hydrochloride(heptaminol hydrochloride). The whole was charged to a 1 liter tantalum lined autoclave and stirred at 185° C. for 24 hours. The reaction mixture, after being discharged from the autoclave, was added to a hot solution of 750 parts sodium hydroxide in 1500 parts of water and stirred until cool. The organic phase was ether extracted, washed with water, evaporated and distilled under reduced pressure. After recovering 58 parts of aniline, there was then obtained 135 parts of 2-amino-6-(4-aminophenyl)-6-methyl-heptane $b_{0.7}138°$-$40°$ (82% yield based on heptaminol) with the following percentage composition by weight.

|  | Carbon | Hydrogen | Nitrogen |
|---|---|---|---|
| Found | 76.36 | 11.27 | 13.01 |
| Calculated for $C_{14}H_{24}N_2$ | 76.31 | 10.98 | 12.71 |

Similarly prepared from heptaminol hydrochloride are the Examples 2 to 12 shown in Table I.

TABLE I

| Example | Aromatic Amine | Product | bp °C./ pressure | Molecular Formula | Found & Required % Composition | | |
|---|---|---|---|---|---|---|---|
|  |  |  |  |  | C | H | N |
| 2 | o-toluidine | 2-amino-6-(4-amino-3-methylphenyl)-6-methyl-heptane | 192–6 13 mb | $C_{15}H_{26}N_2$ | 76.87 76.56 | 11.18 11.49 | 11.95 12.25 |
| 3 | p-toluidine | 2-amino-6-(2-amino-5-methylphenyl)-6-methyl-heptane | 120–30 0.3 mb | $C_{15}H_{26}N_2$ | 75.65 76.56 | 12.81 11.49 | 11.44 12.25 |
| 4 | 2,6-dimethyl aniline | 2-amino-6-(4-amino-3,5-dimethylphenyl)-6-methyl-heptane | 126–30 0.07 mb | $C_{16}H_{28}N_2$ | 77.11 77.36 | 11.06 11.36 | 11.28 11.28 |
| 5 | 2-ethyl-aniline | 2-amino-6-(4-amino-3-ethylphenyl)-6-methyl-heptane | 188–94 13 mb | $C_{16}H_{28}N_2$ | 77.36 77.36 | 11.78 11.36 | 10.96 11.28 |
| 6 | 2,6-diethyl-aniline | 2-amino-6-(4-amino-3,5-diethylphenyl)-6-methyl-heptane | 196–200 13 mb | $C_{18}H_{32}N_2$ | 78.59 78.20 | 12.28 11.67 | 10.18 10.13 |
| 7 | 2-isopropyl-aniline | 2-amino-6-(4-amino-3-isopropylphenyl)-6-methyl-heptane. | 190–8 16 mb | $C_{17}H_{30}N_2$ | 78.07 77.80 | 11.76 11.52 | 10.67 10.67 |
| 8 | 2,6-diiso-propyl aniline | 2-amino-6-(4-amino-3-5-diisopropylphenyl)-6-methyl-heptane | 210–6 16 mb | $C_{20}H_{36}N_2$ | 78.08 78.88 | 11.88 11.92 | 10.03 9.20 |
| 9 | 2-methyl-6-isopropyl-aniline | 2-amino-6-(4-amino-3-methyl-5-isopropyl-phenyl)-6-methyl-heptane | 190–200 16 mb | $C_{18}H_{32}N_2$ | 78.56 78.20 | 11.49 11.67 | 10.09 10.13 |
| 10 | 2-methyl-6-t-butyl aniline | 2-amino-6-(4-amino-3-methylphenyl)-6-methyl-heptane(identical with the product of Ex. 2) | 198–204 13 mb | $C_{15}H_{26}N_2$ | . |  |  |
| 11 | 2-ethyl-6-sec.-butyl aniline | 2-amino-6-(4-amino-3-ethyl-5-sec-butyl-phenyl)-6-methyl-heptane | 200–10 16 mb | $C_{20}H_{36}N_2$ | 79.44 78.88 | 11.86 11.92 | 9.19 9.20 |
| 12 | 2-chloro-aniline | 2-amino-6-(4-amino-3-chlorophenyl)-6-methyl-heptane | 192–7 13 mb | $C_{14}H_{23}ClN_2$ | 66.15 65.99 | 9.43 9.10 | 12.70 10.99 |

EXAMPLE 13

123 parts of aniline and 84 parts of 3-amino-2,2,12-trimethyltridecan-13-ol were dissolved in a solution comprising 166 parts of 36% w/w aqueous hydrochloric acid, 89 parts anhydrous zinc chloride and 130 parts of water. This solution was then stirred at 180° for 90 hours in a 1 liter tantalum autoclave and then worked up as in Example 1, after pouring the reaction mixture into 250 parts of sodium hydroxide in 500 parts of water. Distillation under reduced pressure gave 85 parts of a first fraction which consisted mainly of aniline. This was followed by a mixture of 62 parts of 3-amino-12-(4-aminophenyl)-2,12-dimethyl-tetradecane and 3-amino-13-(4-aminophenyl)-2,13-dimethyl-tetradecane $b_{0.1}$ 184°–8° (57% yield based on the aminotridecanol) which had the following percentage composition by weight.

|  | Carbon | Hydrogen | Nitrogen |
|---|---|---|---|
| Found | 79.19 | 12.40 | 8.46 |

|  | Carbon | Hydrogen | Nitrogen |
|---|---|---|---|
| Calculated for $C_{22}H_{40}N_2$ | 79.45 | 12.12 | 8.43 |

EXAMPLE 14

9.3 parts of aniline and 5.7 parts of 1,11-diamino-2,11-dimethyldodecane were dissolved in a solution made up from 15.3 parts of 36% w/w aqueous hydrochloric acid, 6.8 parts anhydrous zinc chloride and 15 parts of water. This solution was sealed into a glass carius tube and heated at 185° for 10 days and then worked up as in Example 1, after pouring the reaction mixture into 25 parts sodium hydroxide in 50 parts of water. Distillation under reduced pressure gave 4.7 parts of a forerun followed by 6.3 parts of 1-amino-11-(4-aminophenyl)-2,11-dimethyldodecane $b_{0.07}190°$–$200°$ (77% yield based on the diaminododecane and 93% purity of product).

The product had the following precentage composition by weight:

|  | Carbon | Hydrogen | Nitrogen |
|---|---|---|---|
| Found | 78.11 | 12.35 | 9.97 |
| Calculated for $C_{20}H_{36}N_2$ | 78.88 | 11.92 | 9.20 |

EXAMPLE 15

To a solution of 34 parts of anhydrous zinc chloride in 51 parts of 36& w/w aqueous hydrochloric acid were added 46.5 parts of aniline and 18.2 parts of 6-hydroxy- 6-methyl-2-heptylamine hydrochloride. The whole was charged to a 3-necked round bottomed flask fitted with a thermometer, stirrer, and Dean and Stark water separator. The stirred reaction mixture heated by means of an electric heating mantle was raised to a temperature of 185° C. by removal of water (Dean and Stark), and then maintained at this temperature for a further 18 hours. The hot reaction mixture was then poured slowly into a solution of 75 parts sodium hydroxide in 75 parts water and stirred until cool. The organic phase was extracted with ether, washed with water, evaporated and distilled under reduced pressure. After recovering 28 parts of aniline, there was obtained 18 parts of 2-amino-6-(4-aminophenyl)-6-methylheptane $b_{12}$ 192°–199° C. (82% yield based on heptaminol) with the following percentage composition by weight.

|  | Carbon | Hydrogen | Nitrogen |
|---|---|---|---|
| Found | 76.36 | 11.27 | 13.01 |
| Calculated for $C_{14}H_{24}N_2$ | 76.31 | 10.98 | 12.71 |

EXAMPLE 16

Example 15 was repeated using 53.5 parts of o-toluidine in place of aniline. Distillation under reduced pressure gave 15.6 parts of 2-amino-6-(4-amino-3-methyl-phenyl)-6-methylheptane $b_{10}$ 192°–196° C. (67% yield based on heptaminol) with the following percentage composition by weight.

|  | Carbon | Hydrogen | Nitrogen |
|---|---|---|---|
| Found | 76.36 | 11.49 | 12.25 |
| Calculated for $C_{15}H_{26}N_2$ | 76.87 | 11.18 | 11.95 |

EXAMPLE 17

93 Parts of aniline, 122 parts 36% w/w hydrochloric acid, 68 parts zinc chloride, and 25.7 parts of 3-amino-2,12,12-trimethyltridecan-13-ol were reacted and worked up according to the procedure of Example 15. Distillation under reduced pressure gave 28 parts of 3-amino-12-(4-aminophenyl)-2,12-dimethyl-tetradecane and 3-amino-13-(4-aminophenyl)-2,13-dimethyl-tetradecane $b_{0.5}$ 206°–210° C. (84% yield based on aminotridecanol) with the following percentage composition by weight.

|  | Carbon | Hydrogen | Nitrogen |
|---|---|---|---|
| Found | 79.06 | 12.69 | 7.99 |
| Calculated for $C_{22}H_{40}N_2$ | 79.45 | 12.12 | 8.42 |

EXAMPLE 18

93 Parts of aniline, 122 parts of 36% w/w hydrochloric acid, 68 parts of zinc chloride and 24.3 parts of 3-amino-12,12-dimethyl-tridecan-13-ol were reacted and worked up according to the procedure of Example 15. Distillation under reduced pressure gave 25.5 parts of 3-amino-12-(4-aminophenyl)-12-methyltetradecane and 3-amino-13-(4-aminophenyl)-13-methyl-tetradecane $b_{0.2}$ 188°–98° C. (80% yield based on aminotridecanol) with the following percentage composition by weight.

|  | Carbon | Hydrogen | Nitrogen |
|---|---|---|---|
| Found | 79.46 | 11.42 | 9.05 |
| Calculated for $C_{21}H_{38}N_2$ | 79.18 | 12.02 | 8.79 |

EXAMPLE 19

93 Parts of aniline, 122 parts of 36% w/w hydrochloric acid, 68 parts of zinc chloride, and 25 parts of 1-(3-amino-undec-11-yl)-1-(hydroxymethyl)-cyclohexane were reacted and worked up by the method of Example 15. Distillation gave 24.7 parts of 1-(4-aminophenyl)-1-(3-amino-dodec-12-yl)-cyclohexane $b_{0.4}$ 210°–20° C. (78% yield base on aminoalcohol) with the following percentage composition by weight.

|  | Carbon | Hydrogen | Nitrogen |
|---|---|---|---|
| Found | 79.66 | 11.80 | 8.18 |
| Calculated for $C_{24}H_{42}N_2$ | 80.38 | 11.81 | 7.81 |

EXAMPLE 20

19.36 g (0.0878 moles) of the product of Example 1, 2-amino-6-(4-aminophenyl)-6-methyl-heptane, and 27.97 g (0.0878 moles) of isophthalic acid diphenylester are weighed into a 200 ml round flask fitted with reflux condenser and gas inlet. After the air in the flask has been completely expelled by nitrogen, the flask is immersed in a salt bath the temperature of which is 210° C. The flask is kept at this temperature for three hours while passing through a light stream of nitrogen. The reflux condenser is then replaced by a distillation bridge fitted with a receiving flask, and the temperature is raised to 270° C. in the course of one hour. The greater part of the phenol formed distills over into the receiving flask. Water pump vacuum is then applied (about 2000 Pa), and the residual phenol is distilled off at 270° C. during three hours. A viscous polyamide melt is obtained which on cooling, solidifies into a yellowish transparent mass. 2 to 3 g of the polyamide thus obtained are then moulded into an about 0.3 to 0.5 mm thick sheet, by means of a heatable hydraulic press. The sheet is exposed at room temperature to a relative humidity of 65% until no further increase in weight can be detected.

The reduced solution viscosity of the polyamide obtained is measured on a 0.5% solution in m-cresol at 25° C. and is 0.51 dl/g; its glass transition temperature is determined in a differential calorimeter (DSC) and is 159° C.

What is claimed is:
1. A compound having the formula I

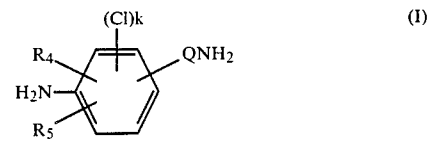

wherein k is 0 or 1; $QNH_2$ is a residue of formula II

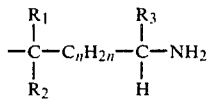

which is situated in one of the positions of the benzene rings ortho or para to the amino group and wherein n is an integer from 1 to 15, $R_1$ is $C_1$–$C_8$ alkyl, $R_2$ is $C_1$–$C_4$ alkyl or $R_1$ and $R_2$, together with the carbon atom to which they are attached, form a $C_5$–$C_8$ cycloalkylene residue, and $R_3$ is H or $C_1$–$C_6$ alkyl, $C_3$–$C_8$ cycloalkyl or $C_6$–$C_{10}$ aryl; and $R_4$ and $R_5$, independently, are H or $C_1$–$C_4$ alkyl; as well as the corresponding salts of compounds of formula I with organic or inorganic acids; and metal salt complexes.

2. A compound of formula I according to claim 1 wherein k is 0.

3. A compound of formula I according to claim 1 wherein k is 0, $R_4$ and $R_5$, independently, are H or $C_1$–$C_3$ alkyl and $QNH_2$ is a residue as defined in claim 1 wherein n is 1 to 15, $R_1$ is $C_1$–$C_6$ alkyl, $R_2$ is $C_1$–$C_3$ alkyl, and $R_3$ is $C_1$–$C_6$ alkyl.

4. A compound of formula I according to claim 3 wherein $R_4$ and $R_5$ are each H or methyl, n is 3, 8 or 9, $R_1$ is $C_1$–$C_4$ alkyl, $R_2$ is methyl or ethyl and $R_3$ is $C_1$–$C_4$ alkyl.

5. A compound of formula I according to claim 4 wherein $R_4$ and $R_5$ are H, $R_1$ is methyl or ethyl, $R_2$ is methyl and $R_3$ is methyl or isopropyl.

6. The compound according to claim 1 which is 2-amino-6-(4-aminophenyl)-6-methylheptane.

7. The compound according to claim 1 which is 2-amino-6-(4-amino-3-methylphenyl)-6-methylheptane.

8. A compound according to claim 1 which is 3-amino-12-(4-aminophenyl)-2,12-dimethyltetradecane, 3-amino-13-(4-aminophenyl)-2,13-dimethyltetradecane or a mixture thereof.

* * * * *

UNITED STATES PATENT AND TRADEMARK OFFICE
CERTIFICATE OF CORRECTION

PATENT NO. : 4,647,699

DATED : March 3, 1987

INVENTOR(S) : Frederick H. Howell

It is certified that error appears in the above—identified patent and that said Letters Patent is hereby corrected as shown below:

On the cover page, Item [63] should read --

Continuation of Ser. No. 388,361, Jun. 14, 1982, abandoned --.

Signed and Sealed this

Twenty-seventh Day of October, 1987

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,647,699
DATED : March 3, 1987
INVENTOR(S) : Frederick H. Howell

It is certified that error appears in the above—identified patent and that said Letters Patent is hereby corrected as shown below:

On the cover page, Item [63] should read --

Continuation of Ser. No. 388,361, Jun. 14, 1982, abandoned --.

Signed and Sealed this

Twenty-second Day of December, 1987

Attest:

DONALD J. QUIGG

*Attesting Officer*          *Commissioner of Patents and Trademarks*